United States Patent [19]
Santoro

[11] 4,359,180
[45] Nov. 16, 1982

[54] CASSETTE TAPE RECORDER

[76] Inventor: Giovanni Santoro, Via Campodimele 55, Roma, Italy

[21] Appl. No.: 134,546

[22] Filed: Mar. 27, 1980

[30] Foreign Application Priority Data

Apr. 2, 1979 [IT] Italy .............................. 48589 A/79

[51] Int. Cl.³ .............................................. B65H 17/22
[52] U.S. Cl. ................................................. 226/188
[58] Field of Search ............................ 242/200–204, 242/206, 208, 209, 210, 75.3; 360/74.1, 74.2, 106; 226/178–190, 194; 318/6

[56] References Cited

U.S. PATENT DOCUMENTS

| | | | |
|---|---|---|---|
| 3,416,501 | 12/1968 | Pinto et al. | 242/75.51 X |
| 3,419,686 | 12/1968 | Rhoades | 242/201 X |
| 3,464,613 | 9/1969 | Ura | 226/178 |
| 3,533,633 | 10/1970 | Wilder | 360/74.1 |
| 3,534,923 | 10/1970 | Wakabayashi | 242/208 |
| 3,900,174 | 8/1975 | Morimoto et al. | 242/209 |

Primary Examiner—Leonard D. Christian

[57] ABSTRACT

A tape transport system for cassette tape recorders wherein a member engages the drive belt between the two flywheels and exerts a dragging action, such that the belt lengths each side of the member will be respectively tight or not tight according to the direction of rotation of the drive pulley thus increasing the traction on the tight length of the belt. The corresponding pulley will rotate at a slightly higher speed than the other pulley and the tape length between the two transport units will always be automatically tightened up.

9 Claims, 6 Drawing Figures

CASSETTE TAPE RECORDER

This invention refers to improvements in the drive system for cassette tape recorders comprising two tape transport units.

As it is well known in the art, cassette tape recorders of a certain type comprise two tape transport units, the motor drive being transmitted thereto using a belt drive by means of a pulley integrally formed with the drive shaft and two pulleys generally provided on the periphery of the flywheel which is integrally formed with each of the tape transport units. Each tape transport unit comprises capstan and a pinch roller associated thereto and the magnetic playback, record and erase head or heads are located between these two tape transport units.

In the recorders of this type two tape transport units are utilized in order to obtain a tape speed as constant as possible, in the only possible direction, thus improving the playback of the recorder.

Also the recorders provided with reverse operation comprise two tape transport units, one of these units being used for the normal operation and the other for the reverse operation thereof.

The operation of these two types of cassette tape recorders comprising two tape transport units is not completely satisfying in the former and it is not as satisfying as it could be in the latter.

The recorders comprising two tape transport units and unprovided with reverse operation have a drawback in that, since the two transport units acting simultaneously on the tape rotate at the same speed, these transport units cannot exert any tensioning action on the tape length comprised therebetween, as it would be desirable both for tensioning the tape length engaging the magnetic head, in order to improve the recorder characteristics, and for tightening up any undesirable slack in this length.

On the other hand, in the recorders comprising two tape transport units and provided also with reverse operation, the possibilities offered by the presence of these two transport units are not completely utilized since these units are used one at a time with a considerably inefficient use of the components, as mentioned above.

Accordingly, it is an object of the invention to provide a tape transport system for cassette tape recorders overcoming all the above-mentioned drawbacks, which tape transport system comprises two tape transport units and the drive associated thereto.

The invention provides a tape transport system for cassette tape recorders comprising two tape transport units, wherein both units exert a gripping action on the tape and the transport unit located downstream of the magnetic head rotates at a higher speed than the transport unit located upstream thereof.

Furthermore, the system of the invention presents this desirable characteristic also for the reverse operation.

According to the improved system of the invention a member adapted to engage the drive belt between the two flywheels exerting a dragging action thereon is provided in the drive system.

This member separates the belt into two distinct lengths each comprised between the drive pulley and the member. These two belt lengths will be respectively tight or not tight according to the direction of rotation of the drive pulley. With such an arrangement the dragging action exerted on the belt will increase the traction on the tight length of the belt.

The higher traction on the tight length of the belt determines a relevant extension of this length and, accordingly, an apparent increase in the diameter of the circumference along which the belt lies in respect of the pulley formed by the flywheel of the tape transport unit located downstream of the member of the invention in the direction of movement of the belt, which pulley will rotate at a higher speed. The tape transport unit located downstream of the magnetic head corresponds to this flywheel and, according to what stated above, the tape length comprised between the two transport units will always be automatically tightened up.

The invention will be now described in more detail with reference to some possible embodiments thereof that are illustrated in the annexed drawings, wherein.

Figure 1:
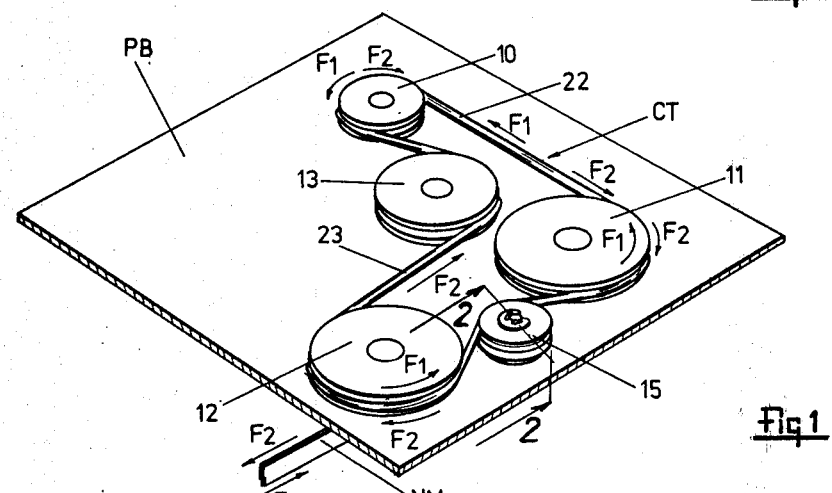
FIG. 1 is a rather schematic perspective view of a first embodiment of the improved tape transport system comprising two tape transport units, according to the invention.
Figure 2:
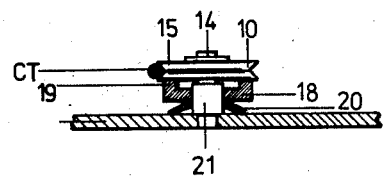
FIG. 2 is a fragmentary sectional view taken along lines 2—2 of FIG. 1.

Particularly with reference to FIGS. 1 and 2, the improved system of the invention is utilized for driving the tape in a cassette tape recorder wherein drive pulley 10, integrally formed with the shaft of the electric motor of the recorder (not shown), transmits the movement of this electric motor to flywheels 11 and 12. The two capstans of the tape transport units are integrally formed with flywheels 11 and 12 and, as it usually happens in the recorders of this type, they are located on the opposite side of bottom plate PB in respect of the side shown in the figure and they are not illustrated therein.

The system is driven by a drive belt CT received into the race of pulley 10, the suitable race on the periphery of flywheels 11 and 12 and the race of intermediate or idle pulley 13.

For the purposes of the invention the construction and operation of the improved system of the invention will be described supposing that idle pulley 13 and flywheels 11 and 12 are independently supported on bottom plate PB so as to freely rotate in respect thereto through drive belt CT driven by drive pulley 10.

It will be evident that idle pulley 13 will rotate about its axis while flywheels 11 and 12 will rotate together with their axes, the corresponding tape transport capstans being integrally formed therewith.

With the above described construction of the drive, flywheels 11 and 12 will rotate in the same direction as drive pulley 10, changing the direction of rotation whenever the pulley direction is changed.

Accordingly, it is an object of the invention to cause flywheel 11 to rotate at a higher speed than flywheel 12 when drive pulley 10 rotates in the direction of arrow F1 and, conversely, flywheel 12 to rotate at a higher speed than flywheel 11 when pulley 10 rotates in the direction of arrow F2. For a better understanding of what stated above in the first part of the description, FIG. 1 schematically shows also magnetic tape NM which will be of course on the other side of bottom plate PB in respect of the drive system, the two directions of movement of tape NM corresponding to the rotation of drive pulley 10 either in the direction of arrow F1 or in the direction of arrow F2 being indicated by the same arrows.

In order to obtain a different angular speed of flywheels 11 and 12 so that the two tape transport units keep the tape length comprised therebetween in a tight condition according to both directions of rotation of drive pulley 10, the drive system of the invention comprises a member adapted to exert a dragging action on drive belt CT, thus limiting the free movement thereof.

In a first embodiment of the invention shown in FIGS. 1 and 2, an axis 14 is mounted on bottom plate PB between flywheels 11 and 12. Axis 14 supports a race pulley 15, the position of axis 14 and the diameter of pulley 15 being such that pulley 15 modifies the path of the belt length comprised between flywheels 11 and 12, thus forming a loop which, in the illustrated embodiment, is directed inwardly of the periphery of these flywheels.

Axis 14 also supports a friction device 18 acting on pulley 15 to prevent the rotation thereof.

This friction device comprises a friction wheel 18 having an upwardly protruding peripheral edge 19 and placed below pulley 15 and a compression cup-shaped spring 20 acting between bottom plate PB and the lower portion of friction wheel 18, thus urging protruding edge 19 thereof against the lower surface of pulley 15.

It should be noted that both friction wheel 18 and cup-shaped spring 20 are provided with a central elongated opening and are fitted onto lower section 21 of axis 14 which is correspondingly shaped so as to prevent any angular movements of spring 20 and wheel 18 in respect thereto.

With such an arrangement, pulley 15 cannot rotate freely due to the friction exerted thereon by edge 19 of friction wheel 18 and, accordingly, pulley 15 will exert a strong dragging action on moving drive belt CT.

This dragging action will cause either belt length 22 or belt length 23, both comprised between the contact points of belt CT with pulley 15 and drive pulley 10, to be highly tensioned depending on the rotation of drive pulley 10 in the direction of arrow F1 or F2, disregarding the effects of idle pulley 13 on the drive.

The traction exerted on belt length 22 by the dragging action of friction pulley 15 when drive pulley 10 rotates in the direction of arrow F1 will cause length 22 and particularly the arcuated length thereof engaging flywheel 11 to be highly lengthened while length 23 will be less tight. Accordingly, as mentioned above, the movement of drive belt CT will be transmitted to flywheel 11 at a higher speed than to flywheel 12 so that the former will rotate at a higher speed than the latter. Accordingly, if considering the movement of magnetic tape NM schematically shown in FIG. 1, which movement occurs in the direction of arrow F1 in this case, the tape length comprised between the upstream capstan integrally formed with flywheel 12 and the downstream capstan integrally formed with flywheel 11 will be subjected to a traction keeping it suitably tight, as desired.

Evidently, changing the direction of rotation of drive pulley 10, which will thus rotate in the direction of arrow F2, the same phenomenon will occur for belt length 23 which will be now subjected to a strong traction causing flywheel 12 to rotate at a higher speed than flywheel 11 thus tensioning the tape length comprised between the two capstans, which tape will now move in the direction of arrow F2.

Figure 3:
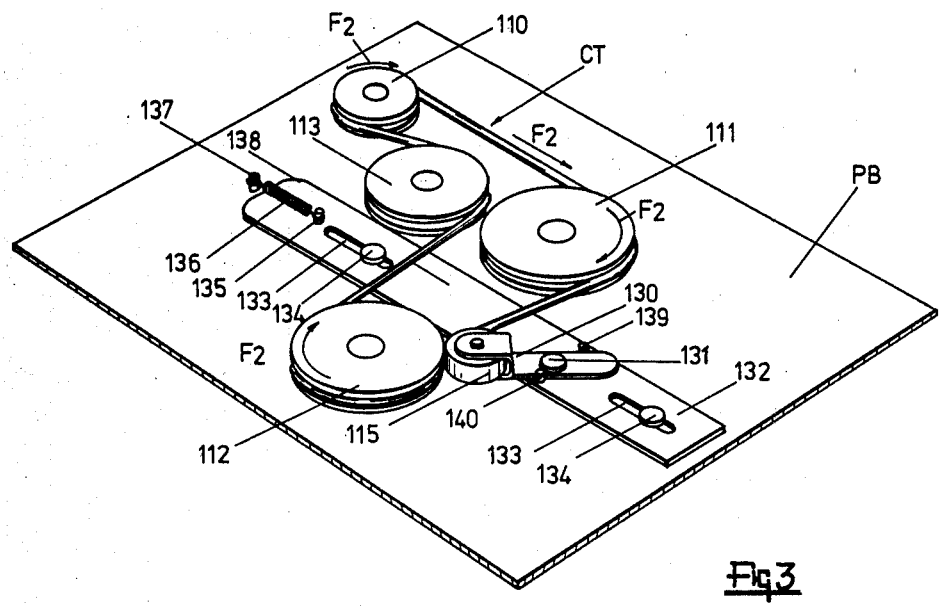
FIG. 3 is a view similar to FIG. 1 showing a second embodiment of the invention in one of the operative positions thereof.
Figure 4:
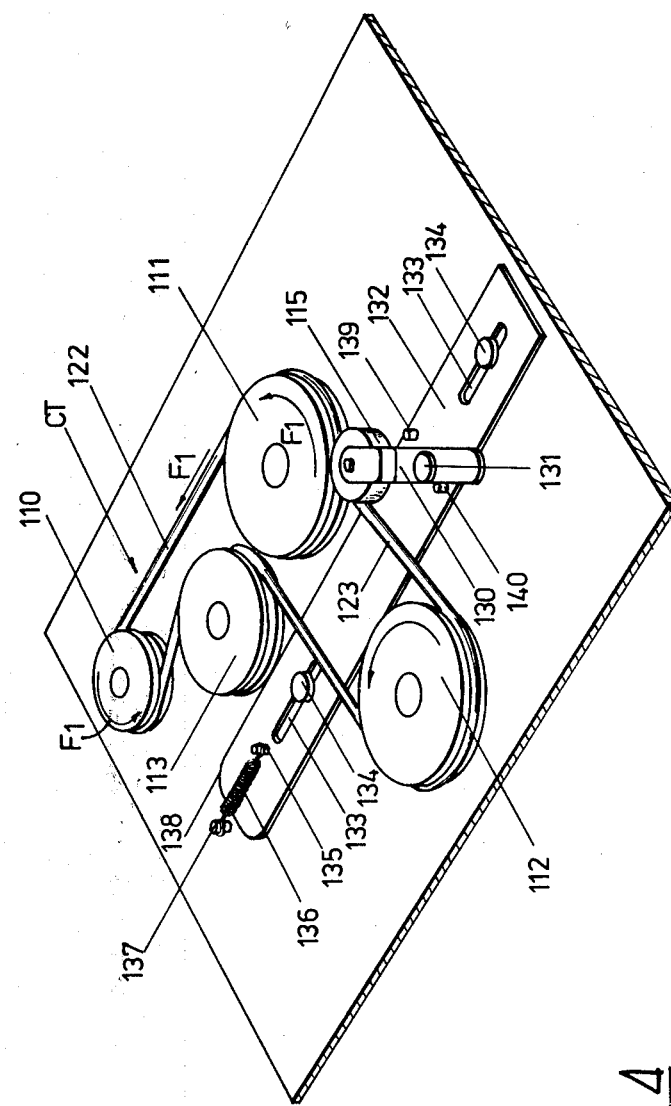
FIG. 4 is a view similar to FIG. 3 showing the second embodiment in the other operative position thereof.

Referring now to FIGS. 3 and 4, there is shown therein a second embodiment of the invention by which the same phenomenon as described above with reference to FIGS. 1 and 2 is obtained.

The embodiment of FIGS. 3 and 4, wherein the parts identical with or similar to the parts of the first embodiment are referred to with the same reference numbers increased by 100, is applied to a drive system comprising a drive pulley 110, two flywheels 111 and 112 and an idle pulley 113.

In this embodiment, the member adapted to exert a dragging action on belt CT is a wheel 115 supported idle by a fork-shaped element 114 integrally formed with a lever 130 pivoted on plate 132 through pin 131.

Plate 132 is supported on bottom plate PB through two elongated openings 133 each receiving a pin provided with a head 134 integrally formed with bottom plate PB.

Plate 132 carries a pin 135 having the end of a traction coil spring 136 anchored thereto, the other end of spring 136 being anchored to a pin 137 integrally formed with bottom plate PB, spring 136 being so shaped as to elastically pull end 138 of plate 132 towards pin 137, which thus acts as a blocking element.

Pins 139 and 140 are also integrally formed with plate 132, these pins being placed on both sides of lever 130 thus forming two blocking elements for suitably limiting the angular movements thereof.

With such an arrangement the dragging action on drive belt CT is exerted by wheel 115 which follows the movements of drive belt CT urging the same against flywheel 111, when drive pulley 110 rotates in the direction of arrow F1 (FIG. 4), and against flywheel 112 when drive pulley 110 rotates in the direction of arrow F2 (FIG. 3).

The angular movements of lever 130 from the position of FIG. 3 to the position of FIG. 4 and vice versa, of course, are caused by the friction of the belt against wheel 115 and they are limited by blocking elements 139 and 140, respectively.

Evidently, the construction comprising sliding plate 132 and spring 136 provides the system with the suitable elasticity.

It will be evident that the dragging action in this second embodiment is of a different nature from the dragging action exerted in the first embodiment, since it is due to wheel 115 which tends to wedge between flywheel 111 (or 112) and pin 131 and to grip drive belt CT against the flywheel.

Accordingly, while devising the mechanism the system should be so designed that this action is neither so strong as to block the belt nor so weak as to be insufficient for tensioning the tight length of the belt. This can be obtained by suitably acting both on the position of pin 131 in respect of flywheels 111 and 112 and the extension of the front arm of lever 130 and on the bias of spring 136 and the position of blocking element 137.

Also in this embodiment the action of wheel 115 will tighten up belt length 122 according to rotations in the direction of arrow F1 and belt length 123 according to rotations in the direction of arrow F2, causing flywheel 111 to rotate at a higher speed in the first case and flywheel 112 to rotate at a higher speed in the second case.

Figure 5:
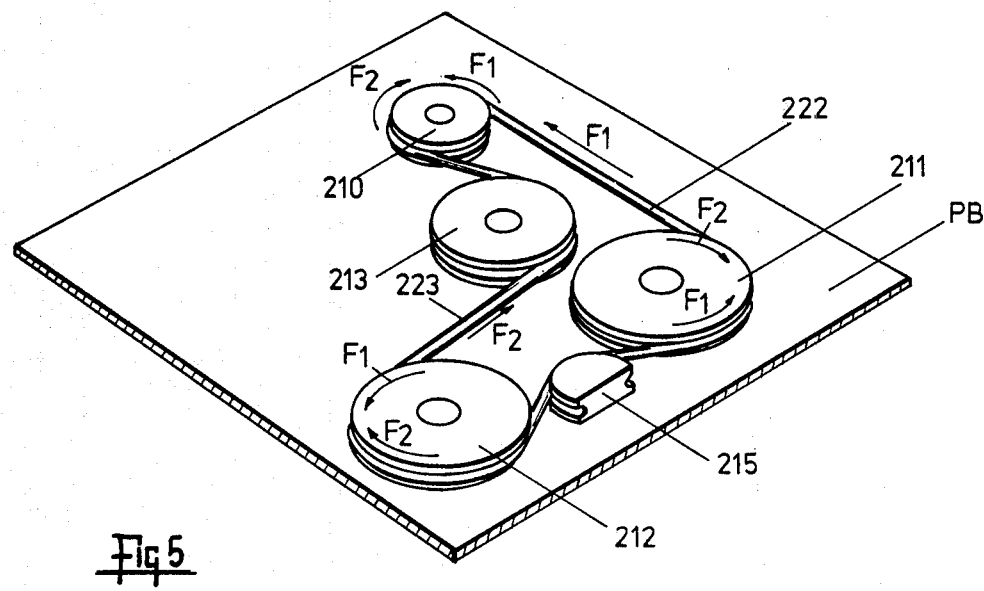
FIG. 5 is a perspective view of a third embodiment of the invention.

The third embodiment shown in FIG. 5, wherein the parts identical with or similar to the parts of FIG. 1 are referred to with the same reference numbers increased by 200, is less complex and comprises a shoe member 215 secured to bottom plate PB between flywheels 211 and 212, thus causing drive belt CT to form a loop.

With such an arrangement, the dragging action on the movement of drive belt CT is due to the friction exerted thereon by the abutment against the periphery of member 215, this friction being high also owing to the pronounced arcuation of the loop.

Figure 6:
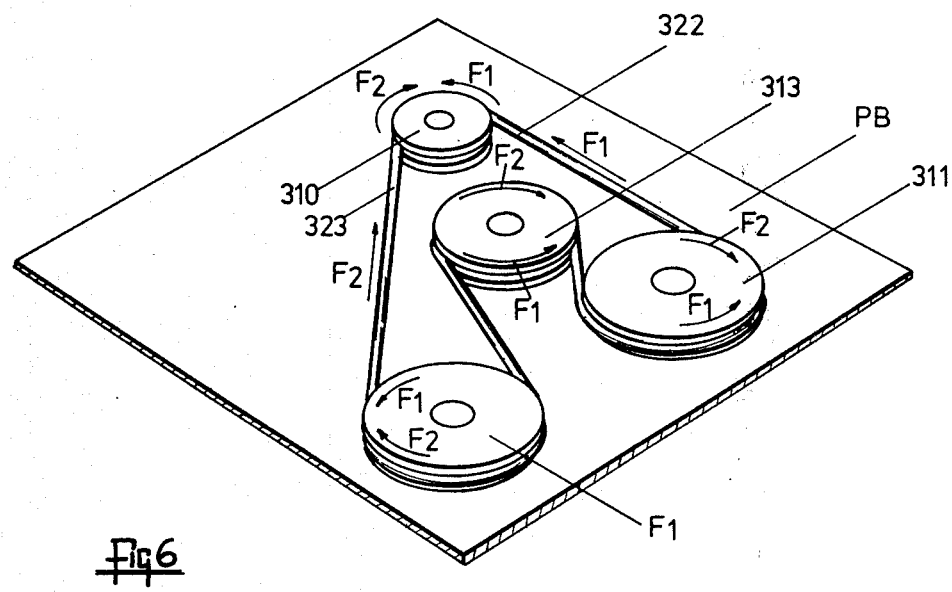
FIG. 6 shows a further embodiment similar in concept to the embodiment of the invention illustrated in FIGS. 1 and 2.

A further possible embodiment of the invention is shown in FIG. 6, wherein the parts identical with or similar to the parts of the embodiment of FIG. 1 are referred to with the same reference numbers increased by 300.

In this embodiment the member adapted to exert a dragging action on belt CT is an idle pulley 313 and, accordingly, the path of belt CT has been suitably modified as shown in the figure.

For the purposes of the invention, pulley 313 could be a friction pulley as pulley 15 described and illustrated in FIGS. 1 and 2.

However, since as it is well known to those skilled in the art, cassette tape recorders are all provided with a friction device connected to the drive shaft of the tape winding up reel, this embodiment of the invention is particularly intended to utilize this friction device which can either be formed by pulley 313 or connected thereto. In this latter case the friction device is not shown in the figure since it will be sufficient to note that it is suitably connected to pulley 313 which makes part of the drive system transmitting the movement of the motor to flywheels 311 and 312.

It will be evident that in both cases the direct or indirect provision of a friction element in the belt drive will cause either flywheel 311 to rotate at a higher speed, according to a rotation of drive pulley 310 in the direction of arrow F1, or flywheel 312 to rotate at a higher speed according to a rotation of drive pulley 310 in the direction of arrow F2.

It will be evident from the embodiments described and illustrated above that the invention fully reaches the objects thereof.

It will also be evident that the invention is not limited to these embodiments and it can be realized also in a different manner without departing from the scope and concepts thereof.

For example, one of the two belt lengths can be tightened up in respect of the other making use of a braking member acting on either one or the other flywheel.

I claim:

1. Improved tape transport system for a magnetic tape recorder comprising:
    a bottom plate integrally formed with said magnetic tape recorder;
    a first tape transport unit adapted to continuously exert a gripping action on said tape, said first transport unit comprising a first flywheel supported on said plate and having a peripheral race;
    a second tape transport unit also adapted to continuously exert a gripping action on said tape, said second transport unit comprising a second flywheel also supported on said plate and having a peripheral race;
    a drive pulley adapted to be driven by a motor member;
    a drive belt received within the race of said drive pulley and the race of said flywheels so as to transmit the rotation of said drive pulley thereto, in the same direction, and,
    a member adapted to exert a dragging action on the length of said drive belt comprised between said flywheels for tightening up the belt length moving from said member towards said drive pulley.

2. The improved system according to claim 1, wherein said member adapted to exert a dragging action is a race pulley provided with a friction device preventing the free sliding movement thereof, said race pulley being placed between said two flywheels and engaging the length of said drive belt comprised therebetween.

3. The system according to claim 1, which includes a lever supported on said plate and wherein said member adapted to exert a dragging action comprises a wheel of a suitable material supported idle at the end of said lever so as to engage the length of said drive belt comprised between said two flywheels, said lever being able to move angularly from a position where said wheel engages one of said flywheels to a position where it engages the other of said flywheels according to the direction of movement of said belt; a plate mounted between said two flywheels on said bottom plate so as to slide longitudinally in respect thereto, said lever being pivoted on said plate; an elastic means acting between said bottom plate and said sliding plate so as to urge said sliding plate to push said wheel against said belt length; a blocking element integrally formed with said bottom plate and adapted to limit the movement of said sliding plate in the direction in which said plate is urged by said elastic means; and, two blocking elements integrally formed with said sliding plate and adapted to limit the angular movements of said lever pivoted thereon.

4. The system according to claim 1, wherein said member adapted to exert a dragging action comprises a rounded shoe having a peripheral race, said shoe being fixedly mounted on said bottom plate between said two flywheels so as to modify the path of the belt length comprised therebetween thus causing said belt length to form a pronounced loop.

5. The improved system according to claim 1, wherein said member comprises the friction device generally provided in cassette tape recorders, said friction device acting on the length of drive belt comprised between said two flywheels through a pulley suitably connected to said friction device.

6. A drive system for the tape transport elements of a magnetic tape recorder comprising:
    a bottom plate integrally formed with said tape recorder,
    first and second capstan axles journaled in said bottom plate,
    first and second flywheels fixed on said first and second axles, respectively,
    and adapted to constitute first and second pulleys, each having peripheral races,
    a reversible drive pulley having a peripheral race mounted on said plate,
    a drive belt frictionally engaged within the races of all pulleys, and
    drive belt drag means mounted on said plate in a position to contact the drive belt along its run between the first and second pulleys and to exert a dragging force on the movement of said belt in either direction.

7. A drive system according to claim 6 wherein said drag means comprises a race pulley provided with a friction brake adapted to resist the free rotational movement of said race pulley.

8. A drive system according to claim 6 wherein said drag means comprises a rounded shoe having a peripheral arcuate race, said shoe being fixedly mounted on said bottom plate between said first and second pulleys in a position to modify the path of the belt run between said pulleys.

9. A drive system according to claim 6 wherein the tape recorder is provided with a conventional friction speed control means and said drag means for the drive belt comprises said conventional friction device.

* * * * *